ated Feb. 6, 1962

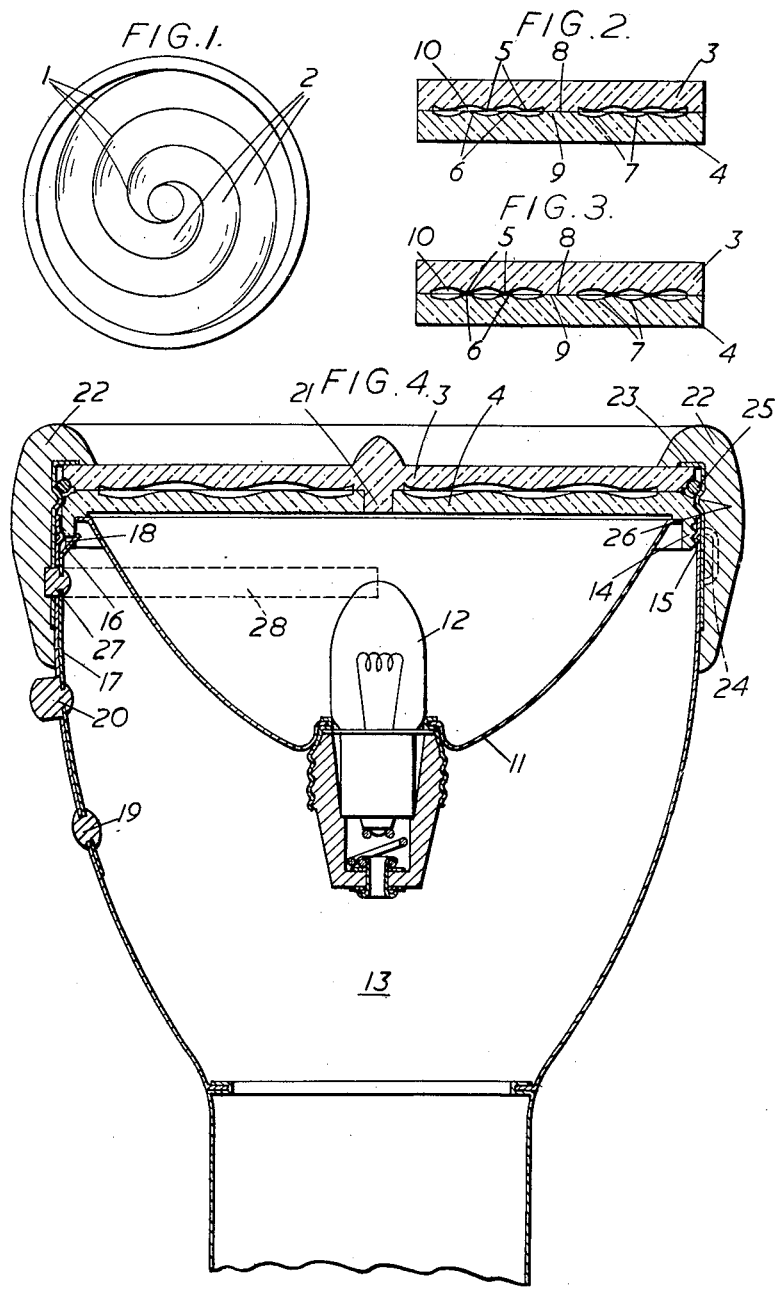

3,020,396
FLASHLIGHT OPTICAL SYSTEM
Arthur Frederick Worboys, London, England, assignor to
The Ever Ready Company (Great Britain) Limited,
London, England, a British company
Filed Mar. 24, 1958, Ser. No. 723,159
Claims priority, application Great Britain Mar. 29, 1957
2 Claims. (Cl. 240—106)

This invention relates to optical systems.

With a battery-operated focussing flash lamp, especailly a torch of the kind in which the relative positions of a bulb filament and a parabolic reflector are adjusted, the divergent beam from the torch produces a pattern of light and dark rings and patches on an object to be illuminated.

It is a main object of the invention to provide an improved optical system for fitting to a light source which provides a substantially parallel beam of light, for example a battery-operated torch, the system being adjustable so that either the beam can pass through without substantial change, or it can be refracted by the system to give a substantially uniform beam of variable divergence.

When the term "crest" is employed herein in relation to an undulatory face it is to be understood as including shapes other than wavy, and examples of alternative crest shapes will be given below.

The optical system may be combined with a battery-operated flash light, for example a torch, comprising a parabolic reflector and a bulb disposed to give a substantially parallel beam of light, the optical system being supported in front of the reflector and bulb.

In order that the invention may be clearly understood, one preferred embodiment thereof will now be described by way of example, with reference to the diagrammatic drawings accompanying the provisional specification in which:

FIGURE 1 is a plan view of a plano-undulatory lens used in optical systems according to the invention, FIGURES 2 and 3 are diametral sections through two plano-undulatory lenses, as shown in FIGURE 1, showing two settings of the lenses, and FIGURE 4 is a section through a battery-operated flash light incorporating two plano-undulatory lenses as shown in FIGURES 2 and 3.

In the drawings like references designate the same parts.

Referring to FIGURE 1 of the drawings, a plano-undulatory lens of circular form has a plane face, and a convoluted, continuously undulatory face formed as two volutes having crests 1 and troughs 2. The two volutes have the same pitch and leave the centre of the lens in directions spaced 180° apart.

In FIGURES 2 and 3 there is illustrated a pair of plano-undulatory lenses 3 and 4 mounted co-axially with their convoluted undulatory faces in opposition for relative adjustment.

The convoluted undulatory face of each lens is formed as two volutes, as illustrated for one lens in FIGURE 1, and the relative angular position of the lenses is adjustable from a position shown in FIGURE 2, in which the crests 5 of the lens 3 register with the troughs 7 of lens 4, to a position, shown in FIGURE 3, in which the crests 5 register with the crests 6 of the lens 4. The lenses are spaced apart by the abutment of faces 8 and 9 on bosses thereon, so that the crests on one lens cannot interlock with the troughs on the other.

A parallel beam of light falling normally on the plane face of one of the lenses will not be refracted at that face, but will be refracted at the undulatory faces of the lenses. With the lenses in the position illustrated in FIGURE 2, although the light is refracted at each of the undulatory faces of the lenses, the deflection of each ray of the beam by the undulatory face of the lens 4 is compensated by the deflection at the undulatory face of the lens 3, and the beam passes through the lenses without substantial change.

When the relative angular position of the lenses is adjusted by rotation of lens 3 relative to lens 4 through an angle of 90°, the crests 5 and 6 of the undulatory faces are moved into registration as shown in FIGURE 3, and the interspace 10 between the lenses is made up of a series of alternate bi-concave and bi-convex sections respectively formed by the co-operation of the overlying crests and troughs of the undulatory faces of the lenses.

Parallel rays of light refracted by each bi-concave section will be rendered convergent, since the refractive index of the air of the interspace is less than that of the material of the lenses, and parallel rays refracted by each bi-convex section will be rendered divergent. Since each of these sections acts as a lens of short focal length, at a distance from the interspace and after refraction through the plane face of lens 3, the total effect will be to render the beam of light divergent, and this divergent beam of light will be of substantially uniform intensity. The maximum possible spacing between the lenses is principally dependent on two factors; namely, the refractive index of the lens material, and the relation of the distance between adjacent crests of the undulations to the depth of the troughs. These factors operate to determine the angle of refraction of each ray of light which passes through the lenses, and the lenses must not be so far apart that the rays which undergo maximum refraction by a crest or trough of lens 4 are incident on a crest or trough of lens 3 which cannot register with that crest or trough of lens 4. These factors are also effective to determine the focal length of each of the sections of the interspace 10 and therefore to determine the maximum possible divergence of the beam.

The convoluted undulatory face of each of the lenses may be formed as a single volute or as a number of volutes of equal pitch which respectively leave their common origin in directions equi-spaced around the origin. If there are $n$ such volutes on the undulatory face of each lens, then the crests on one of the undulatory faces will be moved from the position in which they register with the troughs on the other undulatory face to the position in which they register with the crests on the other undulatory face on relative rotation of the lenses through an angle of $180°/n$.

Referring to FIGURE 4 of the drawings, two lenses 3 and 4 of the kind described above with reference to FIGURES 1 to 3 are supported co-axially on a battery-operated flash light for relative angular adjustment in front of a reflector 11 and bulb 12 which are disposed in a torch-case 13 to give a substantially parallel beam of light. The reflector 11 fits into a cylindrical flange 14 projecting from the periphery of the plane face of the lens 4, the engagement of the reflector in the flange being push-fit. The outside wall of the flange 14 is threaded, and this thread co-operates with a thread 15 projecting inwardly of the torch-case 13 near the end thereof. The lens 4, reflector 11 and bulb 12 are thus removable from the torch-case 13 as a unit.

The lens 4 must be held rigidly with respect to the torch-case to prevent angular rotation of the lens 4 when the angular position of the lens 3 relative thereto is adjusted. This is effected by the engagement of the end 16 of a strip spring 17 in a slot 18 in the flange 14. The spring 17 is fastened to the torch-case 13 by a rivet 19, and a release button 20 attached to the spring 17 is located in a hole in the torch-case. Depression of the button 20 moves the end 16 of the spring 17 out of engagement with the slot 18, to permit rotation of the lens 4 relative to the torch-case.

The lens 3 is mounted co-axially with the lens 4 by a central stub 21 on lens 3 which engages in a central hole in lens 4. The undulatory faces of the lenses 3 and 4 are opposed. A lens ring 22 for the lens 3 has a metal liner 23 which is held in the ring by three embossed tabs 24 spaced 120° apart. The lens 3 is retained in the lens ring 22 by a resilient split ring 25 which engages behind a shoulder 26 on the inside of the lens ring.

The lens ring 22 fits closely over the end of the torch-case 13 and the lens 4, and is retained in position by a holding pin 27 carried by the strip spring 17 and which engages in a peripheral groove 28 on the inside of the lens ring. Rotation of the lens ring 22 relative to the torch-case 13 and reflector 11 effects angular adjustment of the lens 3 relative to the lens 4, and the extent of this adjustment is determined by the extent of the groove 28. Thus the groove 28 extends around a quadrant of the lens ring, and when the holding pin 27 abuts against one or the other end of the groove the crests on the undulatory faces of the lens 3 will register respectively with the crests or troughs on the undulatory face of the lens 4.

Thus the incorporation of the two plano-undulatory lenses 3 and 4 in a battery-operated torch permits the continuous adjustment of the beam of light from a substantially parallel, uniform beam, when the crests on the undulatory face of lens 3 register with the troughs on the face of lens 4 to a substantially uniform beam having a maximum divergence when the crests of the undulating faces of the lenses 3 and 4 are in registration.

The profile of any diametral section of the undulatory face of each of the lenses is as shown in FIGURES 2, 3 and 4, a continuous wavy line, the crests and troughs of which are substantially arcs of circles. This gives, as described above, a substantially uniform beam. If a different beam pattern is required the shape of the crests is changed. For example, to obtain a beam which produces a bright central spot and otherwise substantially uniform illumination the peaks of the crests and the bottom of the troughs are flattened. Light which is incident on the flattened portions of the undulations passes through the lenses without substantial refraction to give the central bright spot, and the light which is incident between the flattened portions of the undulations is refracted as described above to produce the substantially uniform part of the beam.

The torch-case may have a drawn body, into which batteries are inserted through the top after removal of the lenses, reflector and bulb. Alternatively the torch has the usual removable cap and is filled from the bottom.

It is convenient to mount the lenses with their undulatory faces opposed. Alternatively they may be mounted with their plane faces in opposition or with the undulatory face of one lens opposed to the plane face of the other.

In another construction of the lenses, the lens 4 is fixed as shown in FIGURE 4, and the lens 3 is formed with a cylindrical peripheral flange extending at right angles to the plane of the lens. The internal diameter of the flange is such that the lens 3 has the form of a cap which fits frictionally over the lens 4. The continuously undulatory face of each lens may be formed as a number of equal sectors which are alternately concave and convex, so that the convex surfaces form radial crests extending out from the centre of the face, and the concave surfaces form the troughs between the crests. The lenses are relatively adjustable through an angle equal to the angle of one of the sectors, from a position in which the convex surfaces on one undulatory face register with the concave surfaces on the other undulatory face, to a position in which the concave surfaces on both the undulatory faces are in registration.

The lens system may also be applied to any light source which gives a substantially parallel beam, to permit a substantially parallel beam or a substantially uniform divergent beam to be transmitted, for instance for bicycle lamps or vehicle head lamps, interior lighting units in which an adjustable beam spread is desired, theatre lighting, and flood lighting, whatever the source of illumination.

I claim:

1. An optical system for use in a battery-operated flash light, comprising in combination two circular lenses each having a plane face and an undulatory face formed as two volutes which have the same pitch and which leave the centre of the face in directions spaced 180° apart and extend spirally to the lens periphery, and supporting means for supporting the lenses coaxially relative one to the other for relative angular movement so that the relative position of the lenses is continuously variable from a position in which the crests on one undulatory face register with the troughs on the other undulatory face to permit a substantially parallel beam of light to pass through the lenses without substantial change, to a position in which the crests on the undulatory faces are in registration and the beam of light has a maximum divergence, said continuous variation in the relative positions of the lenses giving a continuously spreading beam the intensity of which is always substantially uniform across its width.

2. An optical system for use in a battery operated flashlight, comprising two circular lenses each having a plane face and an undulatory face, and supporting means rotatively supporting said lenses coaxially with their undulatory faces adjacent each other for relative rotation, the undulatory face of each lens being formed by convolute undulations of equal pitch emanating from the axis of the lens and spiralling to the lens periphery in directions equispaced around said axis so that on relative rotation of said lenses from a position in which said undulatory faces are matched to form a parallel sided space between said lenses to a position in which said undulatory faces are in opposition to define convoluted channels extending from said axis to the periphery of said lenses there is produced a continuously spreading light beam always of substantially uniform intensity across its width.

References Cited in the file of this patent
UNITED STATES PATENTS

| | | |
|---|---|---|
| 516,821 | Knowles | Mar. 20, 1894 |
| 1,263,696 | Newton | Apr. 23, 1918 |
| 1,402,816 | Wallis | Jan. 10, 1922 |
| 2,313,356 | New | Mar. 9, 1943 |
| 2,848,601 | Beach | Aug. 19, 1958 |